United States Patent
Ghoddami et al.

(10) Patent No.: US 12,085,516 B2
(45) Date of Patent: Sep. 10, 2024

(54) SYSTEMS AND METHODS OF CHARACTERIZING SEMICONDUCTOR MATERIALS

(71) Applicant: AURORA SOLAR TECHNOLOGIES (Canada) Inc., North Vancouver (CA)

(72) Inventors: Hamidreza Ghoddami, Burnaby (CA); Johnson Kai Chi Wong, Vancouver (CA); Gordon Deans, North Vancouver (CA)

(73) Assignee: AURORA SOLAR TECHNOLOGIES (CANADA) INC., North Vancouver (CA)

( * ) Notice: Subject to any disclaimer, the term of this patent is extended or adjusted under 35 U.S.C. 154(b) by 262 days.

(21) Appl. No.: 17/781,020

(22) PCT Filed: Dec. 4, 2020

(86) PCT No.: PCT/CA2020/051671
§ 371 (c)(1),
(2) Date: May 30, 2022

(87) PCT Pub. No.: WO2021/108921
PCT Pub. Date: Jun. 10, 2021

(65) Prior Publication Data
US 2022/0412896 A1 Dec. 29, 2022

Related U.S. Application Data

(60) Provisional application No. 62/944,350, filed on Dec. 5, 2019.

(51) Int. Cl.
*G01N 21/95* (2006.01)
*G01N 21/35* (2014.01)
(Continued)

(52) U.S. Cl.
CPC ..... *G01N 21/9501* (2013.01); *G01N 21/3563* (2013.01); *G01N 21/59* (2013.01);
(Continued)

(58) Field of Classification Search
None
See application file for complete search history.

(56) References Cited

U.S. PATENT DOCUMENTS 4,636,088 A * 1/1987 Rosencwaig ........ G01N 21/171
374/57
5,007,741 A 4/1991 Carver et al.
(Continued)

FOREIGN PATENT DOCUMENTS

| JP | S62122141 A | 6/1987 |
| WO | 2006118619 A1 | 11/2006 |
| WO | 2018054895 A1 | 3/2018 |

OTHER PUBLICATIONS

World Intellectual Property Organization, International Search Report and Written Opinion, mailing date: Mar. 2, 2021 for PCT Application No. PCT/CA2020/051671.
(Continued)

*Primary Examiner* — David P Porta
*Assistant Examiner* — Djura Malevic
(74) *Attorney, Agent, or Firm* — Norton Rose Fulbright Canada LLP

(57) ABSTRACT

Systems and methods for non-contact characterization of semiconductor devices. Systems may include: an infrared radiation source directing radiation towards the semiconductor device; a radiation directing device positioned proximal the infrared radiation source to direct radiation towards an opposing side of the semiconductor device, the semiconductor device receivable between the radiation directing device and the infrared radiation source; and a radiation
(Continued)

detector proximal to the infrared radiation source to sense radiation associated with a plurality of infrared wavebands from the semiconductor device for determining a dopant profile property of the semiconductor device. The sensed radiation may include radiation originating from the infrared radiation source reflected from the semiconductor device. The sensed radiation may include radiation originating from the radiation directing device and emerging from the semiconductor device. The dopant profile properties may be based on infrared reflectance or infrared transmittance associated with the plurality of respective infrared wavebands.

20 Claims, 11 Drawing Sheets

(51) Int. Cl.
  *G01N 21/3563* (2014.01)
  *G01N 21/59* (2006.01)
(52) U.S. Cl.
  CPC ............... *G01N 2021/3568* (2013.01); *G01N 2021/3595* (2013.01)

(56) References Cited

U.S. PATENT DOCUMENTS

| | | | |
|---|---|---|---|
| 6,242,739 B1* | 6/2001 | Cherkassky | G01B 11/0641 |
| | | | 250/341.4 |
| 6,268,916 B1* | 7/2001 | Lee | G01N 21/211 |
| | | | 356/369 |
| 8,829,442 B2 | 9/2014 | Heaven et al. | |
| 10,386,310 B2 | 8/2019 | Blaine | |
| 11,114,491 B2* | 9/2021 | Chuang | H01L 27/14685 |
| 2004/0092046 A1 | 5/2004 | Kim et al. | |
| 2018/0108579 A1* | 4/2018 | Deans | H01L 31/068 |
| 2018/0315872 A1* | 11/2018 | Balasekaran | H01L 31/03042 |
| 2022/0412896 A1* | 12/2022 | Ghoddami | G01N 21/59 |
| 2023/0207717 A1* | 6/2023 | Bittner | H01L 31/1808 |
| | | | 136/255 |

OTHER PUBLICATIONS

European Patent Office, Supplementary European Search Report dated Nov. 17, 2023 for European Patent Application No. 20895653.2.

* cited by examiner

SYSTEMS AND METHODS OF CHARACTERIZING SEMICONDUCTOR MATERIALS

CROSS-REFERENCE TO RELATED APPLICATIONS

This application claims priority from U.S. provisional patent application No. 62/944,350, entitled "SYSTEMS AND METHODS OF CHARACTERIZING SEMICONDUCTOR MATERIALS", filed on Dec. 5, 2019, the entire contents of which are hereby incorporated by reference herein.

FIELD

Embodiments of the present disclosure generally relate to the field of semiconductors, and in particular to systems and methods of characterizing semiconductor devices.

BACKGROUND

Electronic devices, such as solar panels among other examples, may be constructed to include semiconductor devices. Semiconductor production may include processes to intentionally introduce impurities into undoped or intrinsic semiconductor material. The process of introducing impurities into an undoped or intrinsic semiconductor may be known as doping. During semiconductor fabrication, process control operations may be conducted to determine whether semiconductor substrates may have been doped according to a desired specification.

SUMMARY

The present disclosure provides non-contact systems and methods for characterizing semiconductor devices. Embodiments of the systems and methods may be based on infrared reflectometry, which may be based on infrared reflectance or infrared transmittance intensity measurements for determining dopant profile properties.

In some embodiments, systems may be configured to detect infrared radiation from semiconductor devices under test based on a plurality of infrared radiation wavebands, such that slopes of curves and maxima/minima associated with sensed infrared radiation data may be identified and correlated with dopant profile properties. Dopant profile properties may include sheet resistance, among other examples. The plurality of wavebands may be within the infrared spectrum and may include wavelengths from 1.2 μm to 20 μm. By determining dopant profile properties of semiconductor devices under test, systems disclosed herein may identify disturbances from fabrication process variations.

In some embodiments, systems may be configured to detect reflected radiation from a semiconductor device based on incident infrared radiation for determining infrared reflectance properties associated with the semiconductor device. The incident infrared radiation directed towards the semiconductor device may originate from an infrared radiation source. Systems disclosed herein may also be configured to detect radiation originating from an opposing side of the semiconductor device and emerging from the first side of the semiconductor device for determining infrared transmittance properties associated with the semiconductor device. The radiation directed from the opposing side of the semiconductor device may originate from a supplementary radiation source on the opposing side of the semiconductor device. In some other embodiments, the radiation directed from the opposing side of the semiconductor device may be reflected radiation that originated from the infrared radiation source and that penetrated the semiconductor device. Embodiments of systems disclosed herein may determine a dopant profile property associated with the semiconductor device based on one or a combination of determined infrared reflectance and infrared transmittance properties of the semiconductor device under test.

In an aspect, the present disclosure provides a system for non-contact characterization of a semiconductor device under test. The system may include: an infrared radiation source directing radiation towards the semiconductor device; a radiation directing device positioned proximal the infrared radiation source and configured to direct radiation towards an opposing side of the semiconductor device, the semiconductor device receivable between the radiation directing device and the infrared radiation source; and a radiation detector proximal to the infrared radiation source and configured to sense radiation associated with a plurality of infrared wavebands from the semiconductor device for determining a dopant profile property of the semiconductor device, the sensed radiation including radiation originating from the infrared radiation source reflected from the semiconductor device, the sensed radiation including radiation originating from the radiation directing device and emerging from the semiconductor device. The dopant profile properties may be based on at least one of infrared reflectance or infrared transmittance associated with the plurality of respective infrared wavebands.

In some embodiments, the radiation directing device may be a supplementary radiation source emitting radiation towards and penetrating the semiconductor device, and a portion of the radiation penetrating the semiconductor device may be detected by the radiation detector to determine infrared transmittance associated with the semiconductor device.

In some embodiments, the supplementary radiation source and the infrared radiation source may respectively direct radiation towards the semiconductor device from opposing sides at distinct modulating frequencies. The radiation detector may demodulates sensed radiation from the semiconductor device for determining infrared reflectance or infrared transmittance.

In some embodiments, the radiation directing device may include a paddle configured to convey the semiconductor device proximal to the infrared radiation source and the radiation directing device. The paddle may include a high reflectance background reflecting radiation towards the semiconductor device, the reflected radiation based on radiation emitted from the infrared radiation source.

In some embodiments, wherein the high reflectance background may include at least one of aluminum or gold.

In some embodiments, the paddle may include a low reflectance background positioned adjacent the high reflectance background. The low reflectance background may include at least one of an optical blackout material or an aperture through which incident radiation passes through.

In some embodiments, the low reflectance background may be associated with a first sensing position and the high reflectance background may be associated with a second sensing position towards which radiation from the infrared radiation source is emitted.

In some embodiments, a separation distance between the first sensing position and the second sensing position may be based on an expected spatial uniformity of the semiconductor device under test.

In some embodiments, in response to radiation emitted from the infrared radiation source towards the first sensing position, the radiation detector may be configured to sense reflected radiation from the semiconductor device for determining infrared reflectance.

In some embodiments, in response to radiation emitted from the infrared radiation source towards the second sensing position, the radiation detector may be configured to sense radiation reflected from the radiation directing device and penetrating the semiconductor device for determining infrared transmittance.

In some embodiments, the paddle may be configured to convey the semiconductor device from the first sensing position to the second sensing position or the second sensing position to the first sensing position.

In some embodiments, the plurality of wavebands may be along a waveband spectrum from 1.2 µm to 20 µm.

In some embodiments, at least one of the plurality of wavebands may overlap with an adjacent waveband in the waveband spectrum from 1.2 µm to 20 µm.

In some embodiments, the dopant profile property of the semiconductor device may include sheet resistance or dopant surface concentration.

In another aspect, the present disclosure provides a method for non-contact characterization of a semiconductor device. The method may include: detecting a first radiation sample associated with a plurality of infrared wavebands from a first position, the first radiation sample including radiation originating from an infrared radiation source and reflected from a first side of the semiconductor device; detecting a second radiation sample associated with the plurality of infrared wavebands, the second radiation sample including radiation originating from a radiation directing device positioned on an opposing side of the semiconductor device, the second radiation sample based on radiation emerging from the first side of the semiconductor device; and determining a dopant profile property associated with the semiconductor device based on at least one of infrared reflectance determined based on the detected first radiation sample or infrared transmittance determined based on the detected second radiation sample.

In some embodiments, the radiation directing device may include a reflectance paddle having a low reflectance portion and a high reflectance portion. The first radiation sample may be detected when infrared radiation is directed towards a first position of the semiconductor device adjacent the low reflectance background. The second radiation sample may be detected when infrared radiation is directed towards a second position of the semiconductor device adjacent the high reflectance background.

In some embodiments, the method may include: positioning the reflectance paddle for directing infrared radiation from the infrared radiation source towards the first position of the semiconductor device adjacent the low reflectance background; and in response to detecting the first radiation sample, positioning the reflectance paddle directing infrared radiation from the infrared radiation source towards the second position of the semiconductor device adjacent the high reflectance background.

In some embodiments, a separation distance between the first sensing position and the second sensing position may be based on an expected spatial uniformity of the semiconductor device under test.

In some embodiments, the radiation directing device may include a supplementary radiation source emitting radiation towards and penetrating the semiconductor device. The second radiation sample may be based on radiation originating from the supplementary radiation source and emerging from the first side of the semiconductor device for determining infrared transmittance associated with the semiconductor device.

In some embodiments, the infrared radiation source and the supplementary radiation source may respectively emit infrared light at distinct modulation frequencies. The method may include demodulating the first radiation sample and the second radiation sample.

In some embodiments, the plurality of infrared wavebands includes wavebands along a spectrum from 1.2 µm to 20 µm.

In another aspect, the present disclosure provides a radiation detector for non-contact characterization of a semiconductor device receivable between a radiation directing device and an infrared radiation source. The radiation director may include a one or more radiation sensors, a processor coupled to the one or more radiation sensors, and a memory storing processor-executable instructions that, when executed, configure the processor to conduct one or more operations for characterizing the semiconductor device. The radiation detector may be proximal to the infrared radiation source, and the infrared radiation source may emit radiation towards the semiconductor device. The processor may conduct operations to configure the radiation detector to sense radiation associated with a plurality of infrared wavebands from the semiconductor device for determining a dopant profile property of the semiconductor device. The sensed radiation may include radiation originating from the infrared radiation source reflected from the semiconductor device. The sensed radiation may include radiation originating from a radiation directing device, and penetrating and emerging from the semiconductor device. The radiation directing device may be positioned proximal to the infrared radiation source and configured to direct radiation towards an opposing side of the semiconductor side. The processor may be configured to determine the dopant profile properties based on at least one of the infrared reflectance or infrared transmittance associated with the plurality of respective infrared wavebands.

In another aspect, a non-transitory computer-readable medium or media having stored thereon machine interpretable instructions which, when executed by a processor, may cause the processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the present disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 10 illustrates a flowchart of a method for non-contact characterization of a semiconductor device, in accordance with an embodiment of the present disclosure;

DETAILED DESCRIPTION

Figure 1:
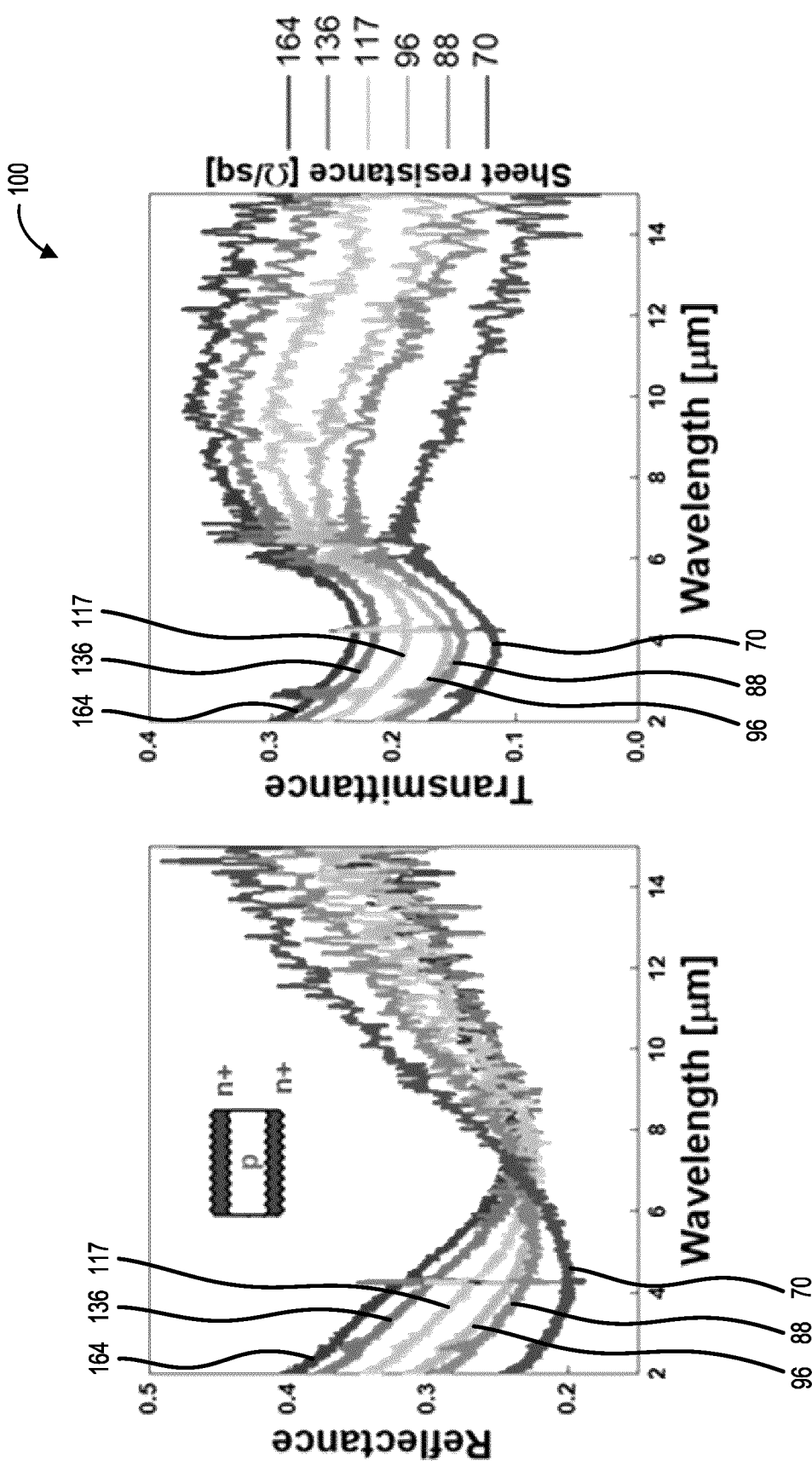
FIG. 1 illustrates a graph showing Fourier-transform infrared spectroscopy (FTIR) detected infrared reflectance and infrared transmittance of a set of double-sided diffused textured wafers.

Semiconductor device fabrication may include processes for intentionally introducing impurities into an undoped semiconductor material or intrinsic semiconductor material. In some examples, a semiconductor wafer may be doped with one or more materials to modify physical properties of the intrinsic semiconductor. For example, a semiconductor wafer may be placed within a phosphorous diffusion furnace and a high concentration phosphorous doping layer may form on the surface of the wafer thereby forming P-N junctions. During semiconductor wafer fabrication, it may be desirable to conduct process controls checks for determining whether doped layers may have properties according to a desired specification.

Semiconductor fabrication processes (e.g., solar cell manufacturing processes, integrated circuit device manufacturing processes, among other examples) may be based on stringently-controlled processes using, for example, diffusion and annealing furnaces and texturing wet benches. With increasing requirements for cost-reduction and increased efficiency, evolving semiconductor manufacturing processes may be based on less stringently controlled processes, thereby increasing variation in dopant profile, texture, substrate bulk resistance, among other examples. Unintended variations in dopant profile may lead to fabrication of semiconductor devices that may not align with desired device specifications.

The process control operations may be conducted to detect dopant profiles for determining dopant profile properties, such as sheet resistance of the semiconductor wafer. In some embodiments, a four-point probe may be used for measuring electrical impedance and for determining sheet resistance at one or more positions on the semiconductor wafer under test. Measuring sheet resistance based on processes utilizing four-point probes may require that one or more probe ends make physical contact with the semiconductor device under test.

It may be beneficial to provide systems and methods of determining semiconductor dopant profile properties based on non-contact operations and based on operations integrated or on-line with semiconductor fabrication processes.

Infrared (IR) reflectometry may include operations for determining dopant profile properties of semiconductor doped layers based on reflectance intensity measurements. As a non-limiting example, IR reflectometry operations may be used for characterizing phosphorus diffused silicon wafers during photovoltaic cell manufacturing.

In some scenarios, refractive index and extinction coefficient of semiconductor materials may vary as a function of free carrier concentration in the infrared spectrum (e.g., 1.2 µm to 20 µm wavelength). As a result of free carrier absorption, IR reflectance at different wavelengths may be functions of dopant profile of doped semiconductor material (e.g., silicon). Such relationships may be identified for correlating reflectance intensity at various wavelengths to dopant profile properties, such as sheet resistance. In some examples, correlating reflectance intensity to dopant profile properties may be based on reference expressions or relationships.

As an illustrating example, dopant profile properties, such as sheet resistance, may be determined based on one or more expressions for combining or correlating detected infrared signals. Embodiments of expressions for determining dopant profile properties may be based on calibration data associated with reference semiconductor devices determined based on data detected by reference measurement devices, such as 4-point probe devices.

In scenarios where infrared radiation wavelength may be greater than 1.2 µm, infrared light may penetrate semiconductor materials (e.g., silicon wafer). In some embodiments, systems and methods may be configured to determine semiconductor properties based on IR reflectance and IR transmittance measurements.

Figure 2:
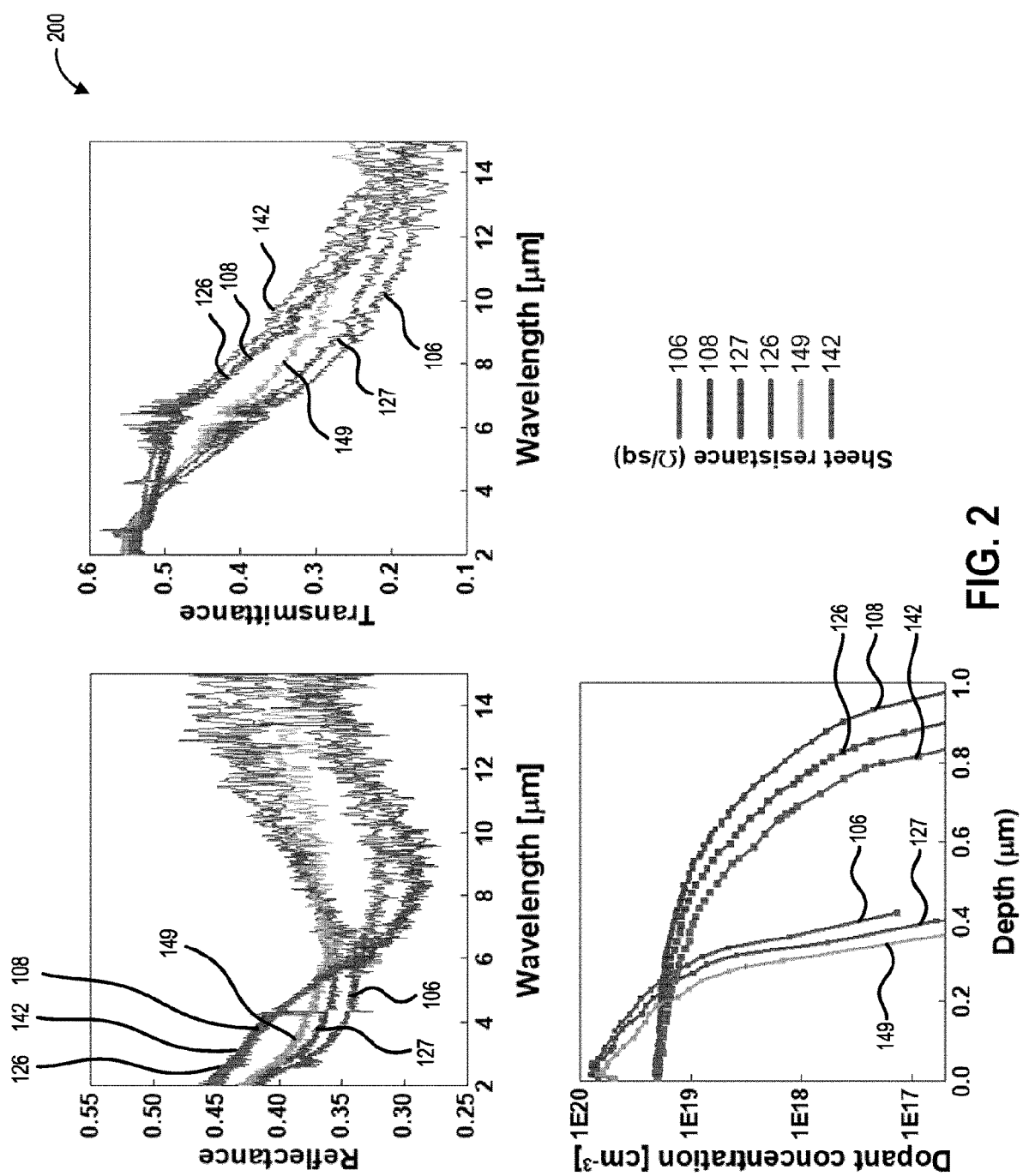
FIG. 2 illustrates graphs showing FTIR detected reflectance and transmittance on sample wafers having similar dopant layer sheet resistance but different dopant profiles.
Figure 3:
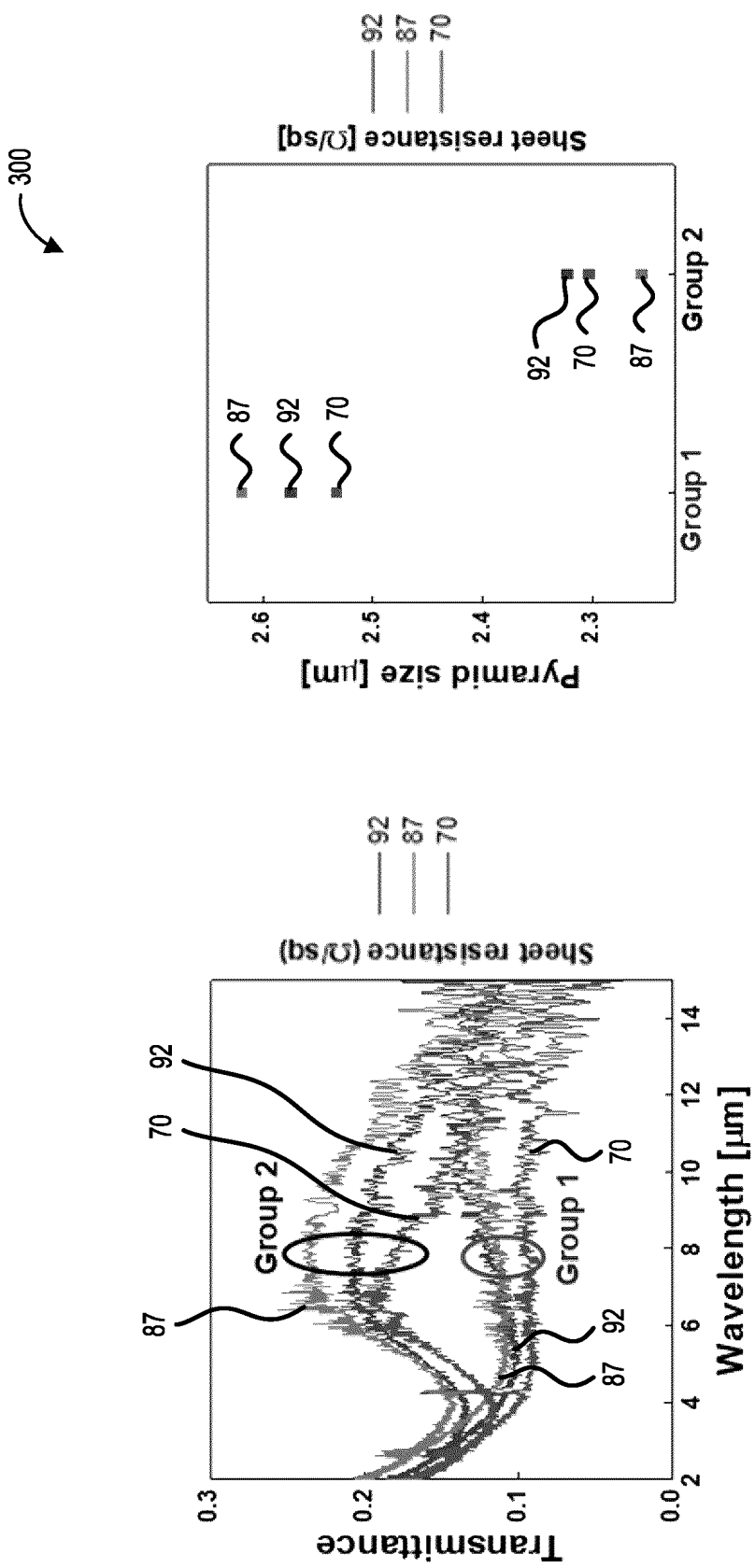
FIG. 3 illustrates graphs showing FTIR scans of two groups of wafers with similar doped layer sheet resistance and dopant profiles but having different texture pyramid sizes.

Fourier-transform infrared spectroscopy (FTIR) or other forms of infrared reflectance/transmittance measurements may be used for measuring dopant profiles of semiconductor devices. In some scenarios, dopant profiles may be correlated with detected infrared reflectance or infrared transmittance, among examples, across a range of infrared wavelengths or wavebands. FIGS. 1 to 3 illustrate example data showing correlations between dopant profile properties (e.g., sheet resistance, pyramid size, etc.) and detected infrared transmittance/reflectance properties across a plurality of infrared wavebands.

Reference is made to FIG. 1, which illustrates a graph 100 showing FTIR detected infrared reflectance and infrared transmittance of a set of double-sided diffused textured wafers with different sheet resistance. The graph 100 illustrates data for wafers with sheet resistance including 165 Ω/square, 136 Ω/square, 117 Ω/square, 96 Ω/square, 88 Ω/square, and 70 Ω/square. For ease of exposition, the data plots of detected IR reflectance and IR transmittance are annotated with the reference numerals 165, 136, 117, 96, 88, and 70 to correspond with respective sheet resistance values.

FIG. 1 illustrates that the slopes of the curves and minima/maxima (e.g., transmittance curves) data may be measured and determined if measurements are conducted across a range of infrared wavelengths or wavebands.

FIG. 2 illustrates graphs 200 showing FTIR detected reflectance and transmittance on sample wafers having similar sheet resistance properties having different dopant profiles. The graphs 200 of FIG. 2 illustrate that high surface dopant concentration may shift the reflectance minima to shorter infrared wavelengths.

FIG. 3 illustrates graphs 300 showing FTIR scans of two groups of wafers with similar doped layer sheet resistance and dopant profiles but having different texture pyramid sizes. The doped layer sheet resistance and dopant profiles may be determined by electrochemical capacitance-voltage technique operations. In the example data associated with the graphs 300 of FIG. 3, "Group 1" wafers having greater pyramid sizes may have lower transmittance at mid-range infrared wavelengths.

FIG. 2 and FIG. 3 show how different semiconductor device emitter profiles and textures (e.g., as disturbances to sheet resistance measurement device operations), respectively, may affect infrared signals.

It may be beneficial to provide systems and methods of determining dopant profile properties of semiconductor devices for filtering out process disturbances during fabrication processes. In embodiments disclosed herein, systems and methods may be configured to determine infrared reflectance at a range of wavelengths/wavebands and determine infrared transmittance at similar ranges of wavelengths/wavebands for determining dopant profile properties of semiconductor devices under test.

It may be beneficial to provide systems and methods for integrating dopant profile property determining operations on-line with semiconductor device fabrication operations for identifying process defects or device yields in substantially real-time based on non-contact profiling of semi-conductor devices. For example, systems and methods disclosed herein may be integrated with semiconductor device fabrication operations, such that dopant profile changes that indicate process defects or yields beyond a desired semiconductor device specification may be identified during the fabrication process.

Embodiments of the present disclosure provide systems for non-contact characterization of a semiconductor device under test. The system may include an infrared radiation source directing radiation towards the semiconductor device and a radiation directing device positioned proximal the infrared radiation source. The radiation directing device may be configured to direct radiation towards an opposing side of the semiconductor device, and the semiconductor device may be receivable between the radiation directing device and the infrared radiation source.

The system may include a radiation detector positioned proximal to the infrared radiation source and configured to sense radiation associated with a plurality of infrared wavebands from the semiconductor device for determining a dopant profile property of the semiconductor device. The sensed radiation may include radiation originating from the infrared radiation source reflected from the semiconductor device. The sensed radiation may also include radiation originating from the radiation directing device and emerging from the semiconductor device.

In some embodiments, radiation detectors may include infrared detectors configured for sensing infrared radiation or light across a plurality of wavebands. In some embodiments, radiation detectors may include signal processing circuitry for signal noise reduction or removal. In some embodiments, radiation detectors may include signal circuitry configured for separating detected reflection signals from detected transmission signals to determine, as an example, infrared reflectance or infrared transmittance properties associated with semiconductor devices under test.

In some embodiments, the radiation directing device may be a reflectance device including a low reflectance portion and a high reflectance portion. To illustrate, reference is made to FIGS. 4A and 4B, which illustrate cross-sectional, elevation views of a system 400 for determining dopant profile properties of semiconductor devices under test, in accordance with embodiments of the present disclosure.

Figure 4B:
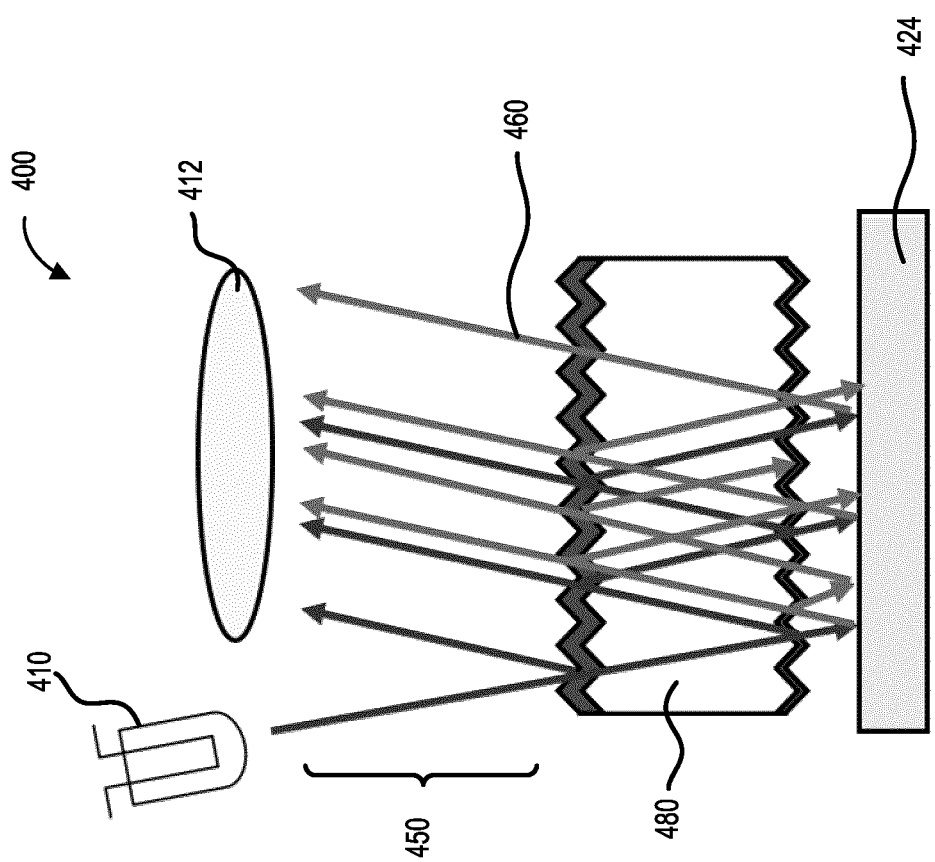
FIGS. 4A and 4B illustrate partial cross-sectional, elevation views of a system for determining dopant profile properties of semiconductor devices under test, in accordance with embodiments of the present disclosure.
Figure 4A:
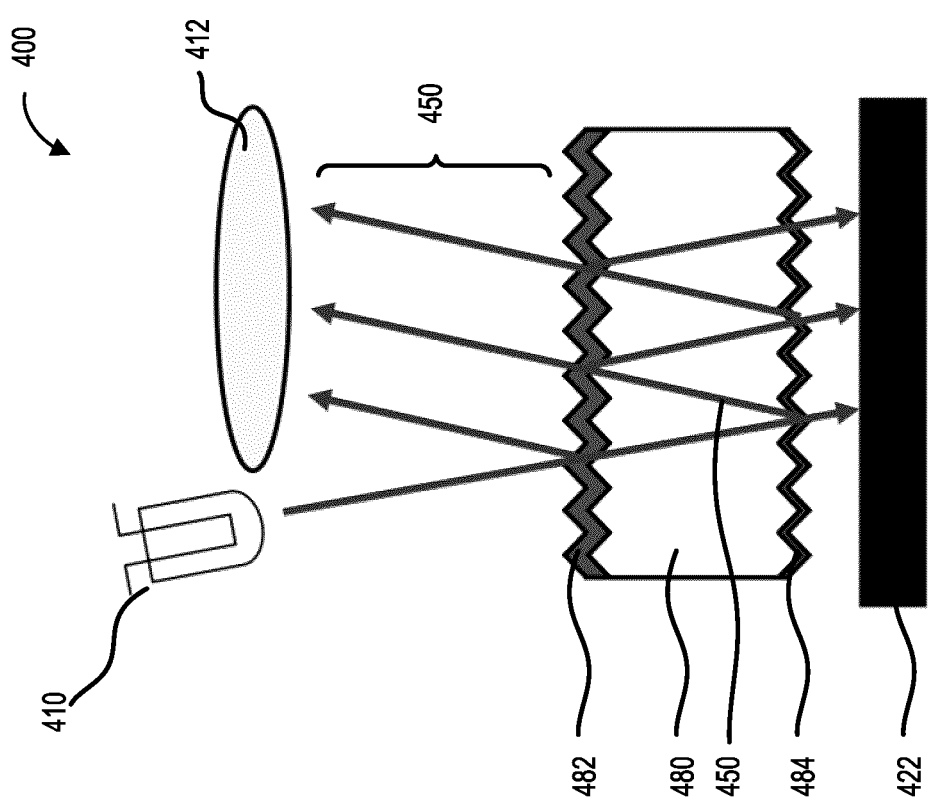

In FIGS. 4A and 4B, the semiconductor device 480 under test may be a double-sided, diffused textured wafer. As a non-limiting example, the semiconductor device 480 under test may be a phosphorous diffused silicon wafer for photovoltaic cell manufacturing. Other types of silicon devices may be contemplated.

FIG. 4A shows reflected light radiation when a portion of a semiconductor device 480 under test is adjacent a low reflectance member 422. FIG. 4B shows reflected light radiation when a portion of the semiconductor device 480 under test is adjacent a high reflectance member 424.

The system 400 may include an infrared radiation source 410 and an infrared detection device 412. In some embodiments, the infrared radiation source 410 may be configured to emit light radiation in the infrared wavelength spectrum.

The infrared detection device 412 may include one or more sensors positioned to receive radiation that is reflected from the semiconductor device 480 under test. In some embodiments, the infrared detection device 412 may include an integrating sphere configured to collect reflected radiation or light from the semiconductor device 480. A combination of the integrating sphere and the one or more sensors may be configured to detect infrared reflectance and infrared transmittance for determining dopant profile properties of the semiconductor device 480. Although examples of dopant profile properties may be described as including sheet resistance, other dopant profile properties of semiconductor devices may be contemplated.

It may be beneficial to provide systems to determine dopant profile properties based on a combination of detected infrared reflectance and infrared transmittance across a range of infrared radiation wavelengths or wavebands.

During system operation, the infrared radiation source 410 may be configured to emit infrared light towards the semiconductor device 480. For ease of exposition, the emitted infrared light is illustrated as light rays interacting with the semiconductor device 480, and the incident infrared light may interact with the semiconductor device 480. At least a portion of the incident infrared light may reflect from at least one of a first device surface 482 or a second device surface 484 (e.g., opposing side of the semiconductor device 480). Other portions of the incident infrared light may penetrate the semiconductor device 480 towards a second device surface 484 and through towards an opposing radiation directing device. In FIG. 4A, the radiation directing device may include a non-reflective surface 422, such as a low-reflectance material. In FIG. 4B, the radiation directing device may include a reflective surface 424, such as a high-reflectance material.

In FIG. 4A, a portion of the semiconductor device 480 is positioned substantially between: (i) the infrared radiation source 410 and the infrared detection device 412; and (ii) the non-reflective surface 422. In some embodiments, the non-reflective surface 422 may be a low reflectance material such as an optical blackout material, and may be configured to inhibit reflection of radiation or light that is incident on the low reflectance material.

For portions of the semiconductor device 480 that are positioned adjacent the non-reflective surface 422, the infrared detection device 412 may substantially detect reflected infrared light associated with those portions of the semiconductor device 480 for determining infrared reflectance data.

In FIG. 4B, another portion of the semiconductor device 480 may be positioned substantially between: (i) the infrared radiation source 410 and the infrared detection device 412; and (ii) the reflective surface 424. In some embodiments, the reflective surface 424 may include a high reflectance background material, such as gold or aluminum, and may be configured to reflect radiation or light that is incident on the high-reflectance material back towards the semiconductor device 480. Other types of high reflectance material may be contemplated.

During system operation, when the infrared radiation source 410 emits infrared light towards the semiconductor device 480, the infrared detection device 412 may detect at least a portion of the infrared light incident on the semiconductor device 480 that is reflected from at least one of a first device surface 482 or a second device surface 484. The system 400 may be configured to determine infrared reflectance data based on the reflected light 450 from the semiconductor device 480.

Further, the infrared detection device 412 may detect other portions of the incident infrared light that penetrates the semiconductor device 480 towards the second device surface 484 and that is reflected back towards the semiconductor device 480 from the reflective surface 424. In the present example, infrared light reflected from the reflective surface 424 and back through the semiconductor device 480 towards the infrared detection device 412 may be detected as double-transmitted light 460, and the system 400 may be configured for determining infrared transmittance data based on the double-transmitted light 460.

In some embodiments, the infrared radiation source 410 may be configured to emit infrared light having a range of wavelengths for characterizing the semiconductor device 480. As described in the present disclosure, to identify process disturbances and to more accurately measure dopant profile properties, it may be beneficial to determine infrared reflectance and infrared transmittance based on detected infrared light across a range of infrared wavelengths.

As a non-limiting example, the infrared radiation source 410 may be configured to emit infrared light at eight or more wavelengths towards the semiconductor device 480, and the infrared detection device 412 may be configured to detect infrared light from the semiconductor device 480 corresponding to the respective wavelengths of the emitted infrared light.

By combining the determined infrared reflectance data and the infrared transmittance data based on: (a) portions of the semiconductor device positioned adjacent a low-reflectance material; and (b) portions of the semiconductor device positioned adjacent a high-reflectance material, the system 400 may be configured to determine dopant profile properties, such as sheet resistance, thereby identifying process disturbances during semiconductor device fabrication that may be beyond desired specification values.

In some embodiments, an estimate of sheet resistance may be determined based on one or a combination of detected infrared reflectance or infrared transmittance signals. The system 400 may conduct operations using reference relationships providing dopant profile properties based on the detected infrared signal inputs.

In some embodiments, the reference relationships for determining dopant profile properties may be based on a plurality of calibrating measurements on reference semiconductor devices having known sheet resistance properties. In some embodiments, the calibrating measurements may be based on four-point probe device measurements for determining sheet resistance properties of the reference semiconductor devices.

Based on the configuration disclosed in FIGS. 4A and 4B, the infrared detection device 412 may determine infrared reflectance data based on a combination of reflected light 450 from the semiconductor device 480, and may determine infrared transmittance data based on a combination of detected double-transmitted light 460 from the semiconductor device 480.

In some embodiments, the infrared detection device 412 may include a memory storing processor-executable instructions that, when executed, configure a processor to conduct operations for non-contact characterization of a semiconductor device. The infrared detector device 412 may include a processor coupled to the memory. The infrared detector device 412 may include one or more radiation sensors coupled to the processor, and the one or more radiation sensors may be positioned to receive radiation signals reflected from or penetrated through the semiconductor device 480 under test.

For example, the one or more radiation sensors may be positioned to receive the reflected light 450 or the double-transmitted light 460 illustrated in FIG. 4. The one or more radiation sensors may be configured to determine energy levels associated with the reflected light 450 or the double-transmitted light 460 for estimating or deducing dopant profile properties of the semiconductor device 480.

In some embodiments, the processor of the infrared detection device 412 may be coupled to the infrared radiation source 410 and may conduct operations to control emitted properties of the infrared light from the infrared radiation source 410. For example, the memory may include processor-executable instructions that configure the processor to modulate the emitted infrared radiation at a particular modulation frequency. Other operations for controlling the infrared radiation source 410 may be contemplated.

Accordingly, in some embodiments, the infrared detection device 412 (e.g., a radiation device) may be for non-contact characterization of a semiconductor device, the semiconductor device receivable between a radiation directing device and the infrared radiation source 410. In the example of FIGS. 4A and 4B, the radiation directing device may be a high reflectance background or a low reflectance background. For example, in FIG. 4B, the radiation directing device may be positioned proximal the infrared radiation source and positioned to reflect radiation towards an opposing side of the semiconductor device.

The infrared detection device 412 may be positioned proximal to the infrared radiation source 410, and the infrared radiation source 410 may emit radiation towards the semiconductor device. The infrared detection device 412 may sense radiation associated with a plurality of infrared wavebands from the semiconductor device, and the processor may conduct operations for determining a dopant profile property of the semiconductor device. The sensed radiation may include radiation originating form the infrared radiation source reflected from the semiconductor device. The sensed radiation may include radiation originating from a radiation directing device that penetrates the semiconductor device and emerges for detection by the infrared detection device 412.

In some embodiments disclosed herein, the processor may be coupled to or integral with the infrared detection device 412 and may execute processor-executable instructions for determining dopant profile properties based on infrared reflectance or transmittance associated with semiconductor devices under test.

Continuing with the embodiments of FIGS. 4A and 4B, to detect the combination of reflected light 450 and double-transmitted light 460 from the semiconductor device 480, in some embodiments, the system 400 may include features for conveying the semiconductor device 480 relative to the infrared radiation source 410 and the infrared detection device 412.

Figure 5:
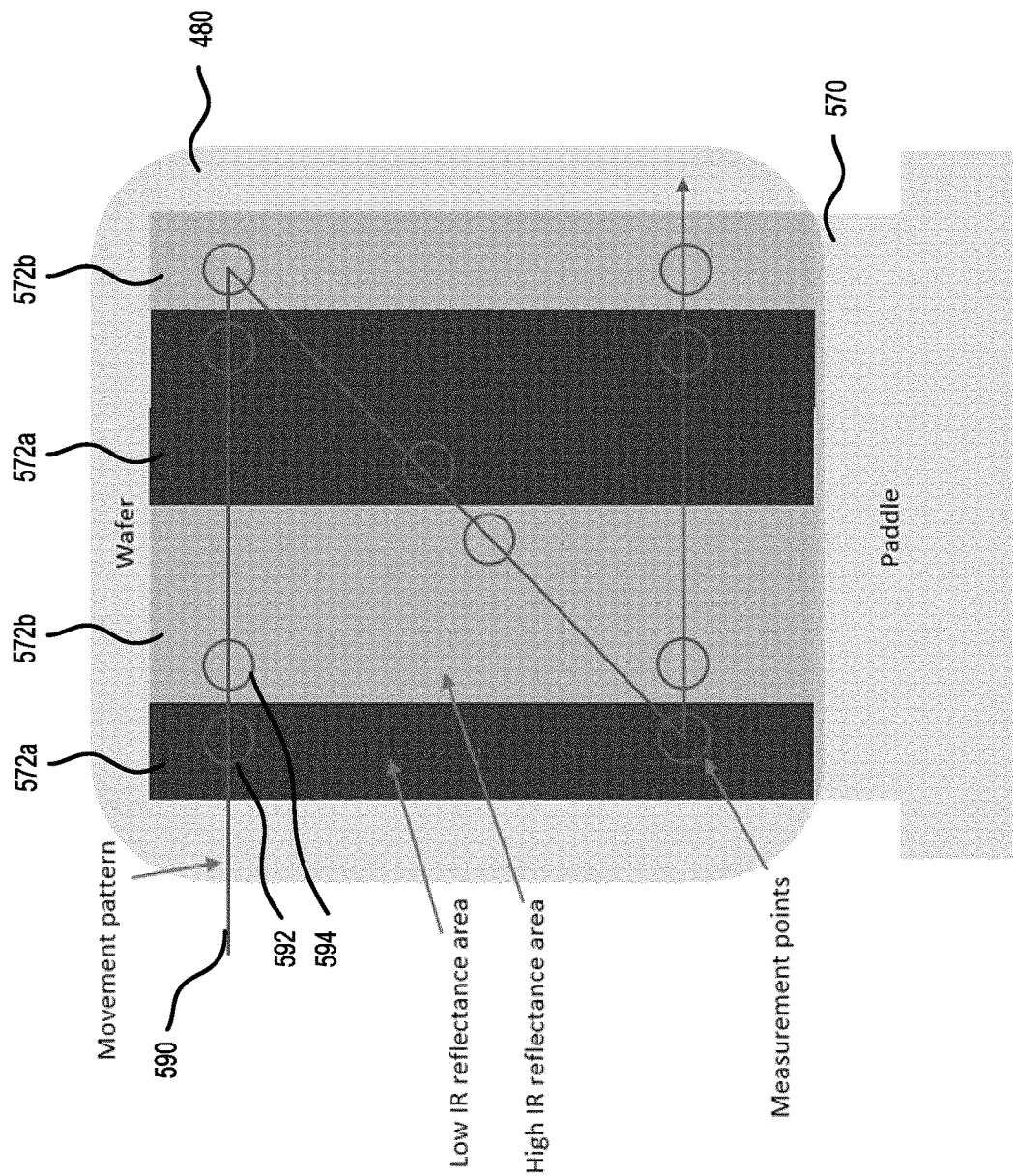
FIG. 5 illustrates a top view of an apparatus for conveying a semiconductor device proximal to an infrared radiation source and an infrared detection device, in accordance with embodiments of the present disclosure.

Reference is made to FIG. 5, which illustrates a top view of an apparatus for conveying the semiconductor device 480 proximal to the infrared radiation source 410 and the infrared detection device 412 (FIG. 4), in accordance with embodiments of the present disclosure. The semiconductor device 480 under test may be wafer, and the semiconductor device 480 may be supported by a reflectance device 570. In some examples, the reflectance device 570 may be an example of a radiation directing device described with reference to FIGS. 4A and 4B.

The semiconductor device 480 (such as a wafer under test) is illustrated as having a substantially rectilinear shape with rounded corners. Other physical shapes or configurations, such as circular wafers, among examples, of the semiconductor device 480 may be contemplated.

The reflectance device 570 may be a paddle configured to support or convey the semiconductor device 480 from a diffusion boat during the semiconductor fabrication process towards the system 400 for characterising the semiconductor device 480.

For ease of exposition, FIG. 5 illustrates a translucent, top view of the semiconductor device 480 being supported by the reflectance device 570. The translucent, top view of FIG. 5 allows illustration of alternating high-reflectance material and low-reflectance material adjacent the semiconductor device 480. In FIG. 5, the reflectance device 570 may be beneath the semiconductor device 480. In some embodiments, the reflectance device 570 may include a plurality of alternating reflectance portions, such as one or more low infrared reflectance portions 572a and one or more high infrared reflectance portions 572b. Other configurations or arrangements of reflectance portions may be contemplated.

The infrared radiation source 410 (FIG. 4, not illustrated in FIG. 5) may be configured to emit infrared light towards the semiconductor device 480 under test, and the infrared detection device 412 (FIG. 4, not illustrated in FIG. 5) may be configured to detect reflected light 450 and detect double-transmitted light 460 from the semiconductor device 480 associated with a sequence of example positions about the wafer under test. For ease of exposition, the sequence of example positions may be highlighted by circular markers along the movement pattern 590.

In some embodiments, the infrared radiation source 410 and the infrared detection device 412 (positioned in an overhead position in FIG. 5) may be at a stationary position. The reflectance device 570 may be configured to successively position the semiconductor device 480 relative to the infrared radiation source 410 and the infrared detection device 412, such that the infrared radiation source 410 may emit infrared light (to be incident on a surface of the semiconductor device 480) and the infrared detection device 412 may detect at least one of reflected light 450 or double-transmitted light 460 at the respective positions along the movement pattern 590.

As an example, when the infrared radiation source 410 emits infrared light at a first position 592 adjacent a low reflectance portion 572a, the infrared detection source 412 may detect reflected light 450 (FIG. 4A). When the infrared radiation source 410 emits infrared light at a position at a second position 594 adjacent a high reflectance portion 572b, the infrared detection source 412 may detect a combination of reflected light 450 and double-transmitted light 460 (FIG. 4B).

The infrared detection device 412 may be configured to determine dopant profile properties, such as sheet resistance, based on a combination of reflectance data associated with the first position 592 and reflectance data/transmittance data associated with the second position 594.

Continuing with the example illustrated in FIG. 5, the system may be configured to convey the reflectance device 570 such that reflected light or double-transmitted light may be detected from the semiconductor device 480 (e.g., wafer under test) at groupings of regions having a low reflectance background and a high reflectance background.

In some embodiments, at the respective positions along the movement path 590, the infrared detection device 412 may be configured to determine the reflectance data or transmittance data based on an array of distinct wavelengths along the infrared spectrum, thereby identifying disturbances based on fabrication process variations, such as surface texture, emitter diffusion profiles, or bulk sheet resistance. In some embodiments, the array of distinct wavelengths may include 8 wavelengths along the spectrum of 1.2 μm to 20 μm. Detecting reflected light 450 or double-transmitted light 460 based on 8 wavelengths of infrared light is an example, and any number of wavelengths of infrared light may be contemplated.

The semiconductor device 480 under test may not be substantially uniform, and may thereby have appreciable variation of dopant profiles across the semiconductor device 480. In the present example where the semiconductor device 480 may not be substantially uniformly doped, determining dopant profile properties may be challenging at least because detecting reflected light 450 (associated with a low reflectance background) and detecting reflected light 450/double-transmitted light 460 (associated with a high reflectance background) may not provide representative data for determining reflectance or transmittance properties of the semiconductor device. In scenarios, where the semiconductor device 480 may not be substantially uniformly doped, the dopant profile properties may be vastly different at the first position 592 relative to the second position 594.

Thus, in some embodiments, the system 400 may be configured to configure the first position 592 and the second position 594 to be within a threshold distance of one another, based on an anticipated degree of spatial uniformity of the semiconductor device 480 under test. In some examples, spatial uniformity of dopants may be associated with concentration of dopants per unit area or unit volume of the semiconductor device.

For example, the system 400 may be configured such that the first position 592 and the second position 594 along the movement path 590 may be within an approximately 20 millimeter by 20 millimeter area. As will be illustrated in an example with reference to FIG. 6, the system 400 may determine that for semiconductor device 480 having a specified degree of spatial uniformity, there may be no appreciable characterization accuracy deterioration when a first measurement position 592 is within 20 millimeters from another measurement position 594 of a pair.

Figure 6:
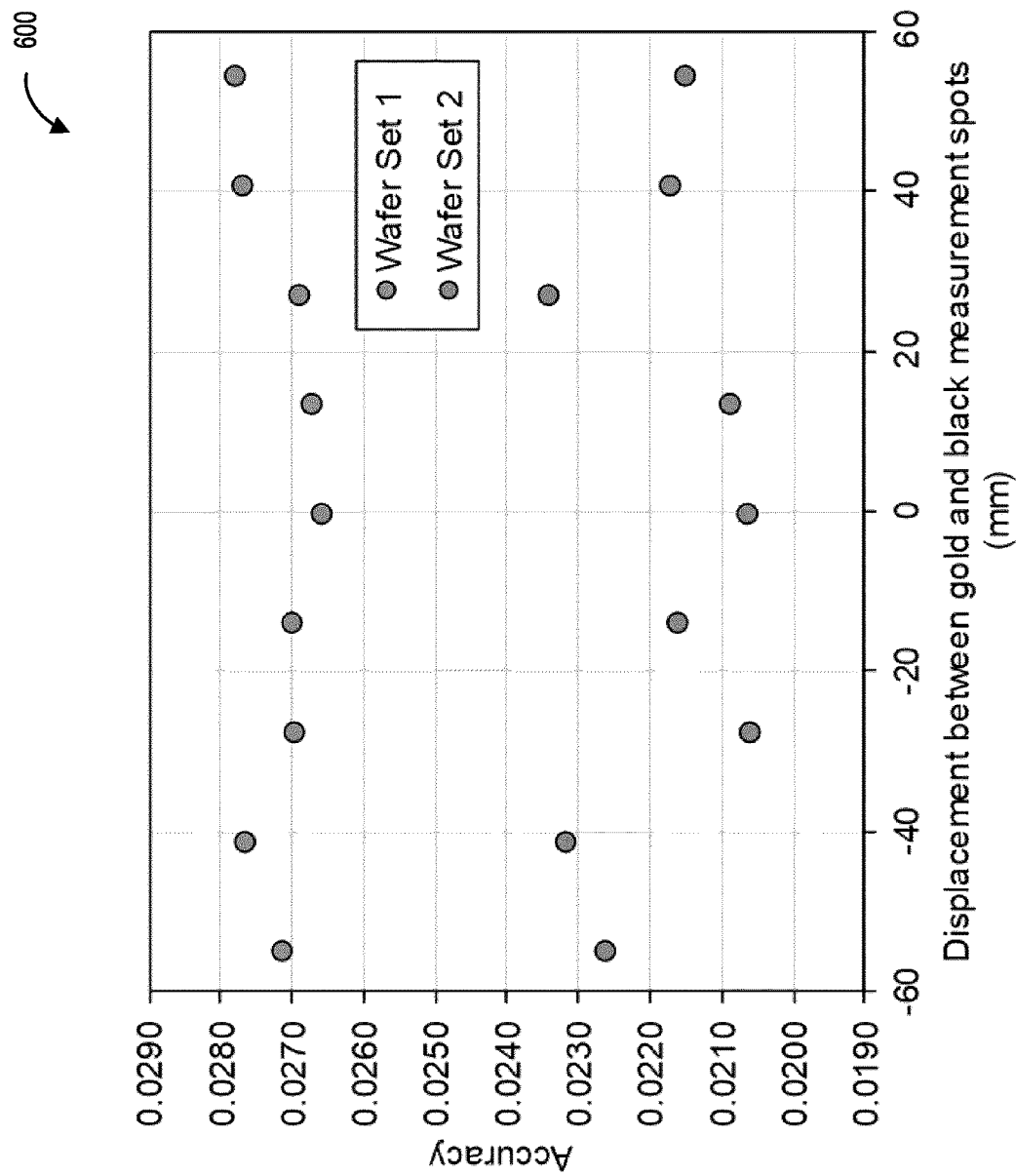
FIG. 6 illustrates a graph showing reflectance measurement accuracy data for a range of displaced measurement positions on wafers under test, in accordance with embodiments of the present disclosure.

Reference is made to FIG. 6, which illustrates a graph 600 showing reflectance measurement accuracy for a range of displaced measurement positions on a wafer under test for two example wafer sets, in accordance with embodiments of the present disclosure.

The graph 600 illustrates a series of measurement accuracy data points associated a relative distance between pairs of measurement positions from which the infrared detection device 412 may detect light. For instance, respective pairs of measurement positions may include a first position atop a low reflectance background and a second position atop a high reflectance background of the reflectance device 570 (FIG. 5).

In the present example, the graph 600 of FIG. 6 shows that there may be minimal deviation in reflectance data accuracy when a pair of adjacent measurement positions (associated with a low reflectance/high reflectance background) are within 20 millimeters of one another. The threshold value of 20 millimeters is merely an example, and the threshold value governing separation of pairs of adjacent measurement points may be dependent on the degree of expected spatial uniformity of the semiconductor device 480 under test. For example, the threshold value may be higher when the expected degree of spatial uniformity of the semiconductor device 480 is higher as compared to when the expected degree of spatial uniformity of the semiconductor device 480 is lower.

Reference is made to Table 1 (below) which summarizes a set of regression data associated with two sets of phosphorus diffused silicon wafers, in accordance with an embodiment of the present disclosure. Regression data may be based on operations conducted by embodiments of systems disclosed herein.

| Calibrate to | Verify with | black | gold | B&G |
|---|---|---|---|---|
| Verification R2 | | | | |
| Wafer Set 1 | Wafer Set 1 | 0.4658 | 0.5740 | 0.6342 |
| Wafer Set 2 | Wafer Set 2 | 0.5815 | 0.5671 | 0.6730 |
| Verification accuracy | | | | |
| Wafer Set 1 | Wafer Set 1 | 0.0320 | 0.0294 | 0.0266 |
| Wafer Set 2 | Wafer Set 2 | 0.0237 | 0.0232 | 0.0206 |
| Verification outlier rate (>10 ohm/sq) | | | | |
| Wafer Set 1 | Wafer Set 1 | 0.1024 | 0.0619 | 0.0486 |
| Wafer Set 2 | Wafer Set 2 | 0.0183 | 0.0000 | 0.0001 |

Table 1 includes regression data associated with scenarios when measurements (e.g., light detected by an infrared detection from the wafer under test) are associated with a portion of the wafer adjacent: (a) a low reflectance background only (e.g., black background material); (b) a high reflectance background only (e.g., gold background material); and (c) a combination of low reflectance and high reflectance background (akin to embodiments disclosed with reference to FIG. 5). The regression data associated with light detected from the wafer adjacent the combined low reflectance/high reflectance background was based on 16 data points (e.g., 8 data points associated with low reflectance background only and 8 data points associated with high reflectance background only).

In the experiments summarized by the regression data of Table 1, reference measurements were conducted based on operations with a four-point probe. When comparing determined/measured dopant profile properties based on operations of (a) the systems and methods disclosed herein; and (b) reference measurement tools, such as operations associated with a 4-point probe, Table 1 shows improvements associated with the coefficient of determination (R2), reduced accuracy (e.g., mean absolute error), and frequency of variation of sheet resistance (as an example of a dopant profile property) greater than 10 that both wafer sets (1 and 2) show improvements associated with 10 Ω/square. In some examples described herein, coefficient of determination may describe how closely measured sheet resistance fits a determined relationship or expression. In some examples described herein, verification accuracy may also describe how closely measured sheet resistance may fit a determined relationship or expression.

FIG. 5 include a reflectance device 570, such as a paddle, having one or more alternating low reflectance/high reflectance background portions. The reflectance device 570 may be configured for conveying the wafer under test to be proximal to the infrared radiation source 410 (FIG. 4) and the infrared detection device 412 (FIG. 4). Over time, as the reflectance device 570 picks-up and support semiconductor wafers, the reflectance background portions may be susceptible to wear, and may become abraded. Scuffed or otherwise abraded high reflectance background portions may exhibit reduced capability for reflecting infrared light back towards the wafer under test, thereby reducing the accuracy of systems and methods for determining dopant profile properties.

It may be beneficial to provide systems and methods to detect reflected and double-transmitted light for detecting reflectance data and transmittance data of a wafer under test to determine dopant profile properties of the wafer under test with reduced reliance on the reflectance background portions illustrated in FIG. 5.

Figure 7:
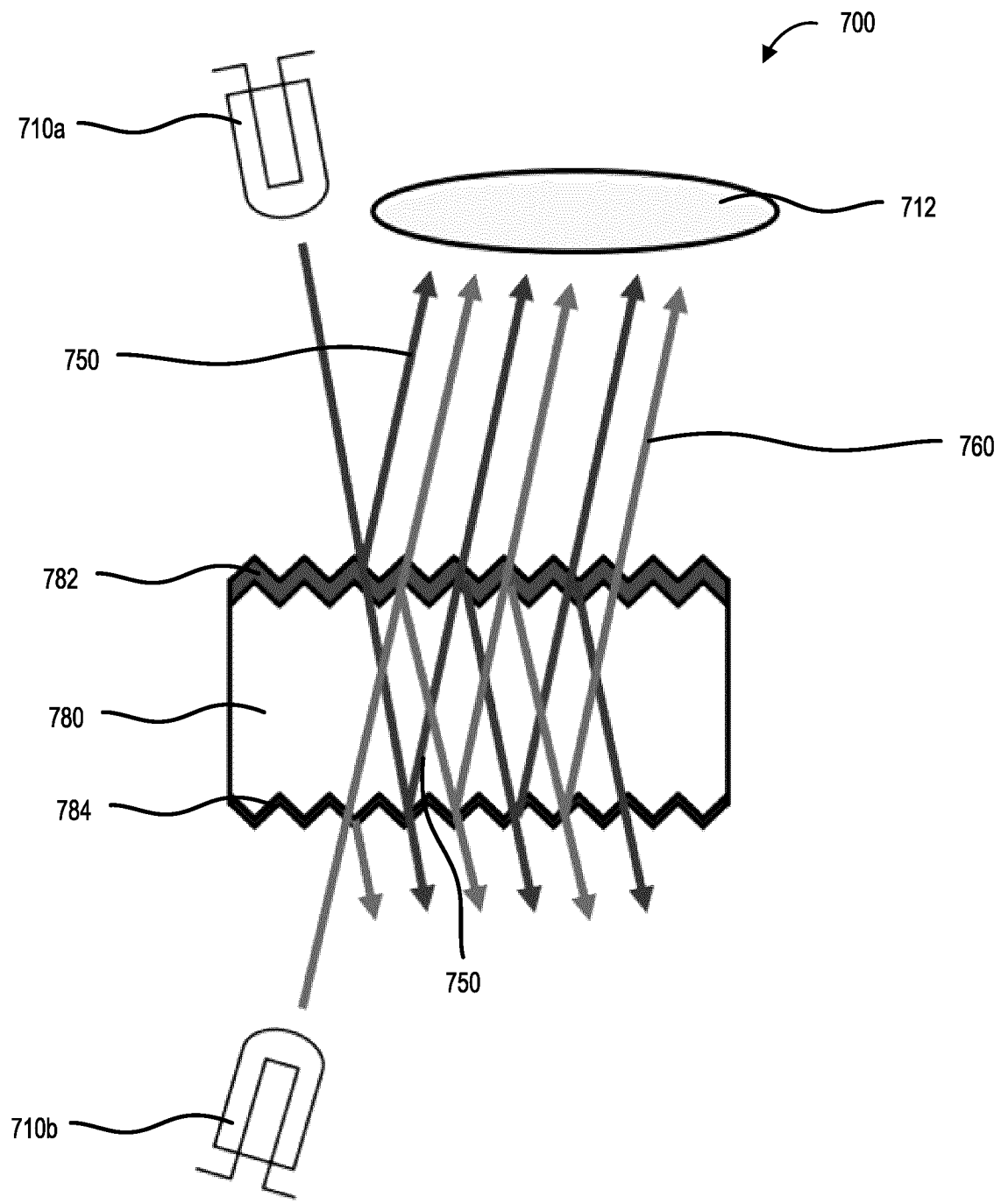
FIG. 7 illustrates a partial cross-sectional, elevation view of a system for determining dopant profile properties of a semiconductor device, in accordance with embodiments of the present disclosure.

Reference is made to FIG. 7, which illustrates a partial cross-sectional, elevation view of a system 700 configured to determine dopant profile properties of a semiconductor device 780, in accordance with embodiments of the present disclosure. In FIG. 7, the semiconductor device 780 may be a double-sided, diffused textured wafer, similar to the wafer under test of FIGS. 4A and 4B. Other types of semiconductor devices 780 under test may be contemplated.

The system 700 includes a first infrared radiation source 710a and an infrared detection device 712. In some embodiments, the first infrared radiation source 710a may emit light radiation in the infrared wavelength spectrum.

The infrared detection device 712 may include one or more sensors positioned to receive from the semiconductor device 780 under test. In some embodiments, the infrared light received from the semiconductor device 780 may be infrared light that originated from the first infrared radiation source 710a and that is reflected from at least one of the first device surface 782 or the second device surface 784 (collectively termed reflected light 750, akin to the reflected light 450 described with reference to FIG. 4A). Infrared light reflected from the second device surface 784 may be based on a portion of light penetrating the first device surface 782 and transmitting through the semiconductor device 784 to the second device surface 784.

In some embodiments, the infrared detection device 712 may be configured to determine infrared reflectance data based at least on the reflected light 750 received from the semiconductor device 780.

Referring briefly again to FIG. 4B, the infrared detection device 412 is configured to determine infrared transmittance data based at least on double-transmitted light 460. In the example illustrated in FIG. 4B, the double-transmitted light 460 included, in part, infrared light that penetrated the semiconductor device 480 and reflected from the reflective surface 424 back through the semiconductor device 480 to be detected by the infrared detection device 412. In some scenarios (described above), the reflective surface 424 may become worn or abraded due at least to repetitive contact with conveyed semiconductor devices 480 under test. It may be beneficial to provide an alternative system that does not rely on a reflectance device 570 that may be abraded or worn over time.

Referring again to FIG. 7, in some embodiments, the infrared detection device 712 may be configured to determine dopant profile properties (e.g., sheet resistance, among examples) based on infrared light emitted by the first infrared radiation source 710*a* positioned proximal the first device surface 782 and a second infrared radiation source 710*b* positioned proximal the second device surface 784 (e.g. an opposing surface to the first device surface 782).

To ameliorate challenges associated with maintaining reflectance devices 570 (FIG. 5) having high reflectance background portions, the system 700 may include the second infrared radiation source 710*b* to emit infrared light towards the second device surface 784, thereby enabling at least a portion of the emitted infrared light (e.g., having wavelength suitable to enable penetration through the semiconductor device) to transmit towards and through the first device surface 782 towards the infrared detection device 712. The second infrared radiation source 710*b* may be an example of a radiation directing device disclosed herein.

The infrared light originating from the second infrared radiation source 710*b* and transmitting through the semiconductor device towards the infrared detector device 712 may be detected as transmitted light emerging from the first device surface 782 as transmitted light 760. In some scenarios, the transmitted light 760 may also be based in part on infrared light that may have penetrated the semiconductor device 780 and reflected at least once from the first device surface 782 and the second device surface 784 before emerging as transmitted light 760 towards the infrared detection device 760.

Infrared light that would have otherwise been provided based on infrared light penetrating the semiconductor and reflected back through the semiconductor device under test by the reflective surface 424 (FIG. 4B) (e.g., double-transmitted light 460) may alternatively be provided by the second infrared radiation source 710*b* in FIG. 7. Accordingly, configuring and positioning the second infrared radiation source 710*b* proximal to the second device side 784 may ameliorate challenges associated with maintaining reflective surface of paddles (e.g., reflectance device 570 of FIG. 5).

In some embodiments, the semiconductor device 780 may be conveyed and supported between the infrared radiation sources (710*a*, 710*b*) and the infrared detection device 712 by a paddle device (not illustrated in FIG. 7) having apertures to allow infrared light from the second infrared radiation source 710*b* to transmit through the semiconductor device 780 and to be detected by the infrared detection device 712.

In some embodiments, the second infrared radiation source 710*b* may emit infrared light having a different modulating frequency than the emitted infrared light from the first infrared radiation source 710*a*. The infrared detection device 712 may be configured to demodulate detected infrared light, thereby separating infrared light originating at least in part from the respective infrared radiation sources (710*a*, 710*b*).

To illustrate, in some embodiments, the first infrared radiation source 710*a* may emit an infrared source signal modulated at 1 KHz and the second infrared radiation source 710*b* may emit an infrared source signal modulated at a frequency that may be 30% or 40% greater than or less than the modulation frequency of the first infrared radiation source 710*a*.

In some other embodiments, the first infrared radiation source 710*a* and the second infrared radiation source 710*b* may emit infrared source signals modulated by time (e.g., time modulation/demodulation).

In some scenarios, modulating emitted infrared source signals based on frequency modulation/demodulation may be more expedient or relatively faster as compared to modulating emitted infrared source signals based on time modulation/demodulation when characterizing semiconductor devices based on operations disclosed herein. For example, operations of characterizing semiconductor devices are configured to characterize wafers in less than 0.6 seconds/semiconductor device, methods of modulating/demodulating the infrared source signals based on frequency may be beneficial.

To identify semiconductor disturbances during fabrication and to more accurately measure dopant profile properties, it may be beneficial to determine infrared reflectance and infrared transmittance based on detected infrared light across a range of infrared wavelengths. Thus in some embodiments, each of the infrared radiation sources (710*a*, 710*b*) may be configured to emit infrared light having a range of wavelengths for characterizing the semiconductor device 780.

The systems (400, 700) of FIG. 4 and FIG. 7 may accordingly be configured to determine dopant profile properties of semiconductor devices under test (e.g., wafers) based on one or a combination of determined reflectance data or transmittance data based on a plurality of infrared wavebands empirically measured at the semiconductor device under test. Determining one or more dopant profile properties of the semiconductor devices under test may be based on a set of one or more infrared radiation sources and an infrared detection device (412, 712), thereby reducing quantity of apparatus for screening semiconductor devices in-line with fabrication operations.

In some embodiments, the infrared detection device 712 disclosed with reference to FIG. 7 may include memory storing processor-executable instructions that, when executed, configure a processor to conduct operations for non-contact characterization of a semiconductor device. The infrared detector device 712 may include a processor coupled to the memory, and the infrared detector device 712 may include one or more radiation sensors coupled to the processor. The one or more radiation sensors may be positioned to receive radiation signals reflected from or penetrated through the semiconductor device 780 under test.

As an example, the one or more radiation sensors may be positioned to receive reflected light 750 or transmitted light 760 for estimating or deducing dopant profile properties of the semiconductor device 780.

In some embodiments, the processor of the infrared detection device 712 may be coupled to the first infrared radiation source 710a or the second infrared radiation source 710b. In some embodiments, the memory may store processor-executable instructions that, when executed, configure the processor to conduct operations to control properties of the emitted infrared light from the infrared radiation source 410. For example, the processor may conduct operations to control the modulation frequency of infrared light emitted from the first infrared radiation source 710a or the second infrared radiation source 710b, respectively. In the present example, the infrared detection device 712 may determine infrared reflectance or infrared transmittance properties based on the reflected light 750 or the transmitted light 760, respectively, illustrated in FIG. 7. Other operations for controlling the infrared radiation sources 710a, 710b may be contemplated.

Figure 8:
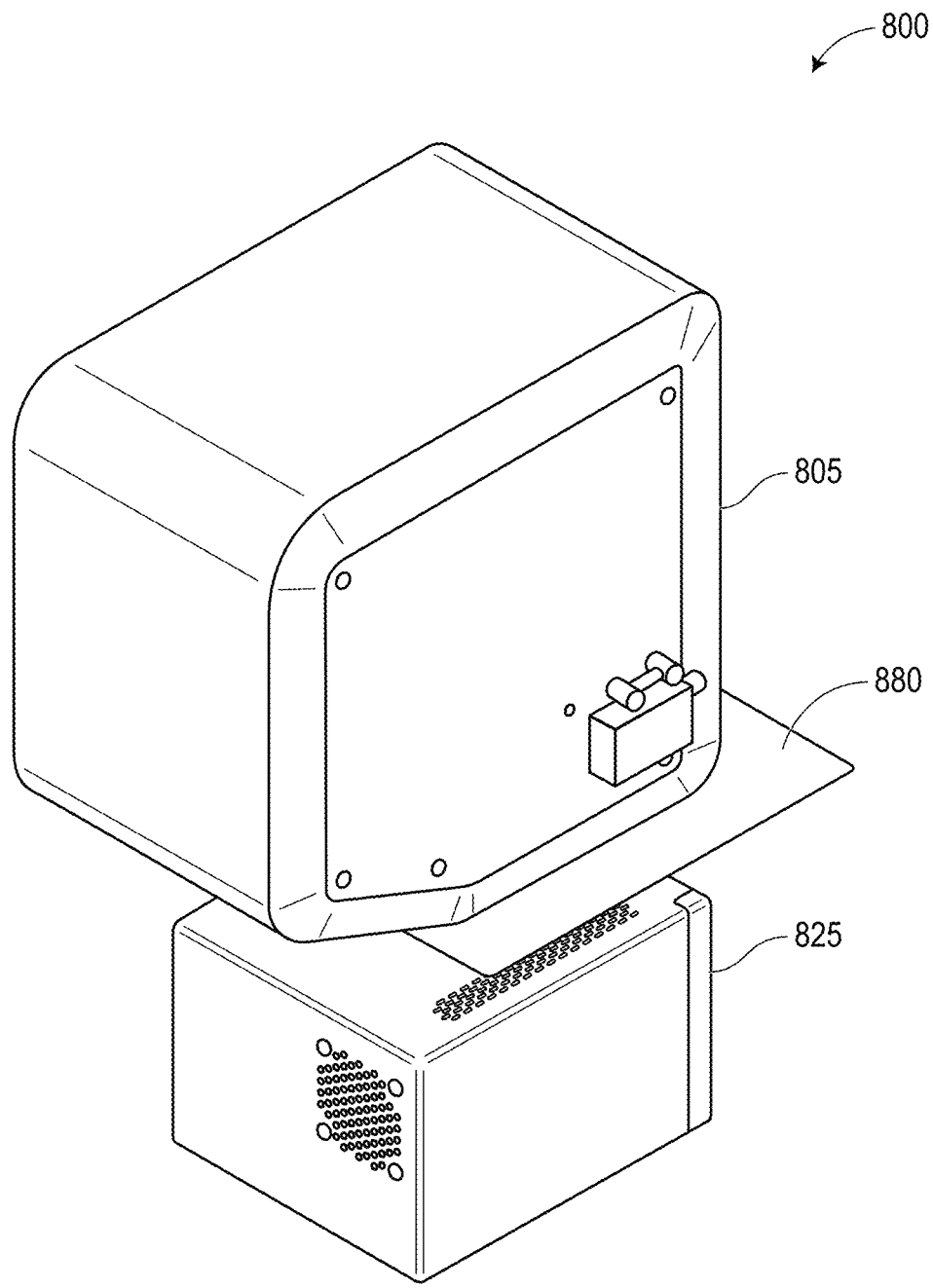
FIG. 8 illustrates a perspective view of a system for characterizing semiconductor devices, in accordance with an embodiment of the present disclosure.

Reference is made to FIG. 8, which illustrates a perspective view of a system 800 for characterising semiconductor devices (e.g., wafers under test), in accordance with an embodiment of the present disclosure. The system 800 may be configured to determine dopant profile properties, such as sheet resistance, of wafers being conveyed through the system 800. In some embodiments, the system 800 may be configured to determine other dopant profile properties such as surface concentration. Dopant surface concentration may be concentration of dopant atoms near the surface of a semiconductor device (e.g., wafer) expressed in units of atoms/cm$^3$. Other dopant profile properties may be contemplated.

The system 800 may include a emitter/detection module 805 positioned proximal to a transmission module 825. A semiconductor wafer under test may be conveyed between the emitter/detection module 805 and the transmission module 825. The transmission module 825 may include a second infrared radiation source for emitting infrared light towards an opposing side of the wafer under test. In some scenarios, the infrared light from the transmission module 825 may be of a wavelength to penetrate the wafer under test, thereby emerging from an opposite side of the wafer under test.

Figure 9:
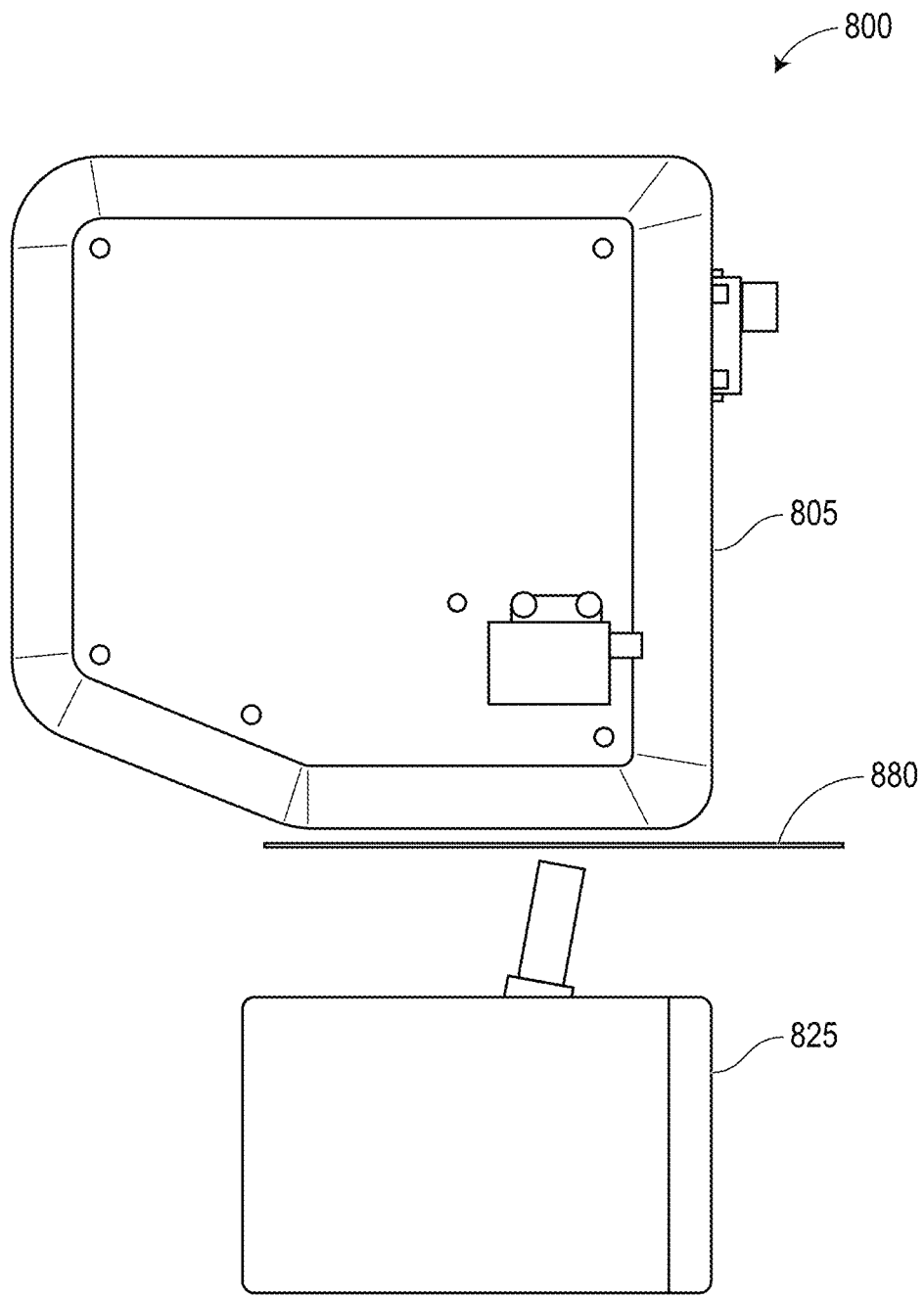
FIG. 9 illustrates a side, elevation view of the system of FIG. 8.

FIG. 9 illustrates a side, elevation view of the system 800 of FIG. 8. The wafer 880 under test may be conveyed between the emitter/detection module 805 and the transmission module 825 by a paddle (not illustrated) or other conveying device. The emitter/detection module 805 may be configured to include a first infrared radiation source and infrared detection device, similar to embodiments disclosed with reference to FIGS. 4A, 4B, and 7. Further, the transmission module 825 may include a second radiation source, similar to the second radiation source 710b of FIG. 7, on a second device surface.

Based on embodiments having features disclosed herein, the system 800 may detect and determine infrared reflectance and transmittance at a plurality of wavebands (e.g., 8 wavelengths within the infrared spectrum) for determining dopant profile properties (e.g., wafer sheet resistance) associated with the wafer under test 880.

Figure 11:
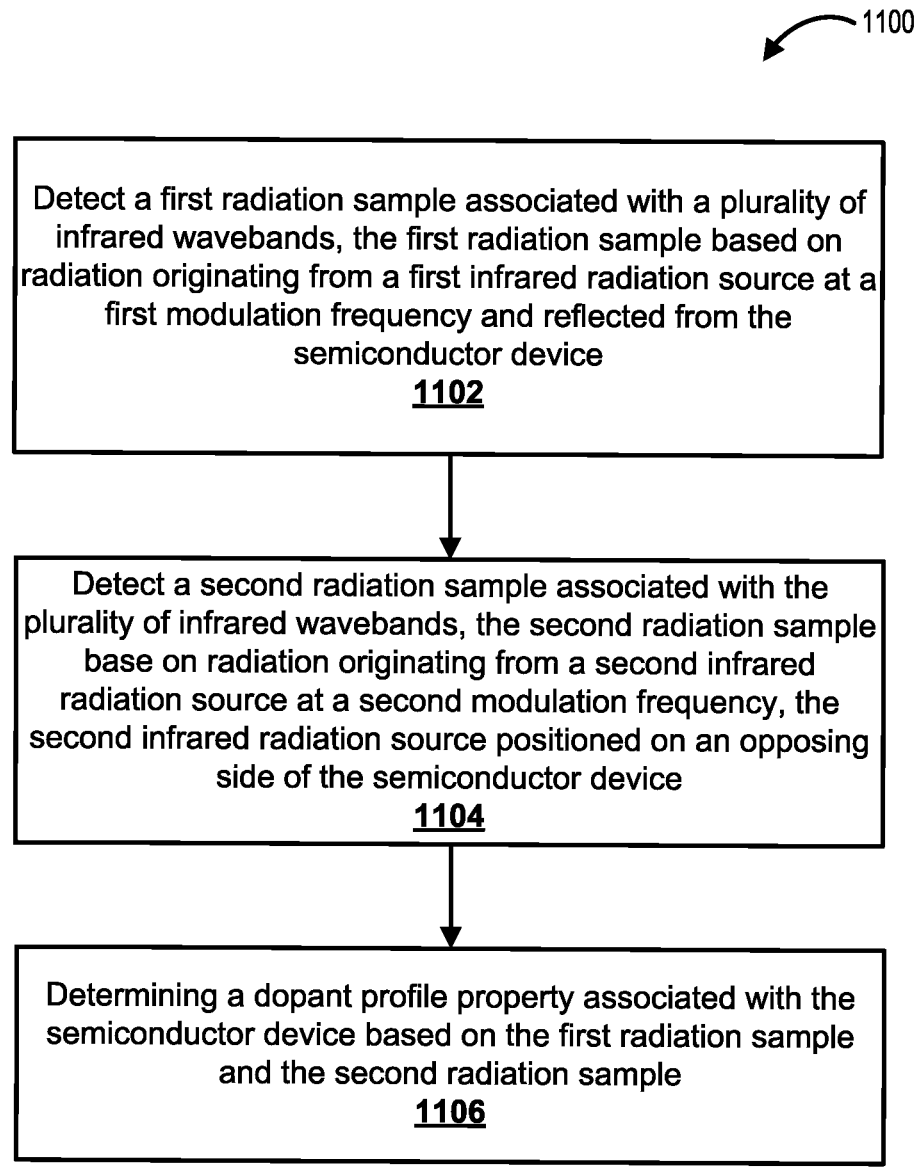
FIG. 11 illustrates a flowchart of a method for non-contact characterization of a semiconductor device, in accordance with an embodiment of the present disclosure.

Embodiments of the present disclosure may include systems configured to conduct methods for non-contact characterization of semiconductor devices. FIG. 10 and FIG. 11 illustrate flowcharts of methods for non-contact characterization of semiconductor devices, in accordance with embodiments of the present disclosure. In some embodiments, operations may be conducted by a processor of a system, such as the system 400 described with reference to FIGS. 4A and 4B or the system 700 described with reference to FIG. 7. The processor may be coupled to or integral with a radiation detector and may execute processor-executable instructions for determining dopant profile properties based on infrared reflectance or transmittance associated with semiconductor devices under test.

As disclosed herein, in some embodiments, an infrared detection device or radiation detector may include one or more radiation sensors, processor coupled to the one or more radiation sensors, and a memory storing processor-executable instructions that, when executed, configure the processor to conduct one or more operations of the method 1000 of FIG. 10 or the method 1100 of FIG. 11.

In some embodiments, the system may detect a first radiation sample associated with a plurality of infrared wavebands from a first position. The first radiation sample may include radiation originating from an infrared radiation source and reflected from a first side of the semiconductor device.

The system may detect a second radiation sample associated with a plurality of infrared radiation wavebands. The second radiation sample may include radiation originating from a radiation directing device positioned on an opposing side of the semiconductor device. The second radiation sample may be based on radiation emerging from the first side of the semiconductor device.

The system may determine a dopant profile property associated with the semiconductor device based on the first radiation sample and the second radiation sample based on operations disclosed herein. For example, the dopant profile property may be based on at least one of (i) infrared reflectance determined based on the detected first radiation sample and (ii) infrared transmittance determined based on the detected second radiation sample.

In some embodiments, the dopant profile property may sheet resistance or dopant surface concentration, among other examples.

In some embodiments, the plurality of infrared wavebands may be wavelengths along a spectrum from 1.2 μm to 20 μm.

FIG. 10 illustrates a flowchart of a method 1000 for non-contact characterization of a semiconductor device, in accordance with embodiments of the present disclosure. For example, the system 400 described with reference to FIG. 4A and FIG. 4B may be configured to conduct operations of the method 1000.

At operation 1002, the system detects a first radiation sample associated with a plurality of infrared wavebands from a first position. The first radiation sample includes radiation originating from an infrared radiation source and reflected from a first side of the semiconductor device.

In response to detecting the first radiation sample, at operation 1004, the system may position a reflectance paddle (e.g., conveying the semiconductor device under test) such that the infrared radiation source may direct infrared radiation towards a second position of the semiconductor device. The second position may be associated with incident infrared radiation at the second position being adjacent a high reflectance background, such that infrared radiation penetrating the semiconductor device may reflect back towards the semiconductor device.

The radiation directing device may include a reflectance paddle having a low reflectance portion and a high reflectance portion, as described with reference to FIGS. 4A, 4B, and 5 herein. In the present example, the first radiation sample may be detected when infrared radiation is directed towards a first position of the semiconductor device adjacent the low reflectance background. In some examples, the first radiation sample may be detected when infrared radiation is directed towards the first position of the semiconductor device where there may be no radiation directing device adjacent the first position of the semiconductor device. When there may be no radiation directing device adjacent the first position, incident infrared radiation penetrating the opposing side of the semiconductor device may not be reflected back towards the opposing side of the semiconductor device.

At operation 1006, the system may detect a second radiation sample associated with the plurality of infrared wavebands. The second radiation sample may be based on radiation originating from the radiation directing device positioned on the opposing side of the semiconductor device. The second radiation sample may be based on radiation emerging from the first side of the semiconductor device.

The second radiation sample may be detected when infrared radiation is directed towards a second position of the semiconductor device adjacent the high reflectance background.

According, the method may include operations for iteratively positioning the reflectance paddle for directing infrared radiation from the infrared radiation source towards the first position of the semiconductor device adjacent the low reflectance background. Further, in response to detecting the first radiation sample, the operations may include positioning the reflectance paddle for directing infrared radiation from the infrared radiation source towards the second position of the semiconductor device adjacent the high reflectance background.

In some embodiments, the separation distance between the first position and the second position may be based on an expected spatial uniformity of the semiconductor device under test. For example, when the semiconductor device under test is expected to have a high degree of spatial uniformity, a distance between the first position and the second position may be approximately 20 mm. Other distances may be contemplated.

At operation 1008, the system may determine a dopant profile property associated with the semiconductor device based on the first radiation sample and the second radiation sample. The dopant profile property may be based on at least one of (i) infrared reflectance determined based on the detected first radiation sample and (ii) infrared transmittance determined based on the detected second radiation sample.

Although the system may position the reflectance paddle, at operation 1004, for adjusting the position at which the infrared radiation source directs infrared radiation towards the semiconductor device, in some other embodiments, the reflectance paddle may be substantially stationary, and the infrared radiation source/infrared detector may be configured to advance along the semiconductor device for determining infrared transmittance or infrared reflectance at a plurality of positions about the semiconductor device under test.

In some other embodiments, the radiation directing device may include a supplementary radiation source for emitting radiation towards and penetrating the semiconductor device from an opposing side of the semiconductor device. For example, the supplementary radiation source may be the second infrared radiation source 710b illustrated in FIG. 7. In the present example, the second radiation sample may be based on radiation originating from the supplementary radiation source that penetrates the semiconductor device and emerges from the first side of the semiconductor device for determining infrared transmittance associated with the semiconductor device.

To illustrate, FIG. 11 illustrates a flowchart of a method 1100 for non-contact characterization of a semiconductor device, in accordance with embodiments of the present disclosure. For example, the system 700 described with reference to FIG. 7 may be configured to conduct operations of the method 1100.

At operation 1102, the system detects a first radiation sample associated with a plurality of infrared wavebands. The detected first radiation sample may be based on infrared radiation reflected by the semiconductor device under test. The infrared radiation may originate from a first infrared radiation source 710a (FIG. 7) at a first modulation frequency. In some embodiments, the system may be configured to determine infrared reflectance associated with the semiconductor device based on the detected first radiation sample.

At operation 1104, the system detects a second radiation sample associated with the plurality of infrared wavebands. The second radiation sample may be based on infrared radiation originating from a second infrared radiation source 710b (FIG. 7) at a second modulation frequency. The second infrared radiation source 710b may be positioned on an opposing side of the semiconductor device. The second modulation frequency may be different than the first modulation frequency. The second radiation sample may be based on infrared radiation penetrating and transmitted through the semiconductor device. In the present example, the system may determine infrared transmittance associated with the semiconductor device based on the second radiation sample.

In the present example, the second infrared radiation source 710b may emit radiation towards the opposing side of the semiconductor device at a modulation frequency different than the modulation frequency of radiation emitted by the first infrared radiation source 710a.

At operation 1106, the system may determine a dopant profile property associated with the semiconductor device based on the first radiation sample and the second radiation sample. The dopant profile property may be based on at least one of (i) infrared reflectance determined based on the detected first radiation sample; and (ii) infrared transmittance determined based on the detected second radiation sample.

In the method 1100 of FIG. 11, although the system may detect the first radiation sample and the second radiation sample without advancing a position of the semiconductor device relative to the radiation source devices or the radiation detector, in some embodiments, the system may advance the position of the semiconductor device under test such that a plurality of first radiation sample/second radiation sample groups may be obtained for determining dopant profile properties based on data readings across numerous locations atop the surface of the semiconductor device under test.

In some embodiments, an infrared detection device or radiation detector may include one or more radiation sensors, processor coupled to the one or more radiation sensors, and a memory storing processor-executable instructions that, when executed, configure the processor to conduct one or more operations of the method 1000 of FIG. 10 or the method 1100 of FIG. 11.

The radiation detector may be for non-contact characterization of a semiconductor device receivable between a radiation directing device and an infrared radiation source.

The radiation detector may be proximal to an infrared radiation source, and the infrared radiation source may emit radiation towards the semiconductor device. The processor may conduct operations to configure the radiation detector to sense radiation associated with a plurality of infrared wavebands from the semiconductor device for determining a dopant profile property of the semiconductor device. As disclosed in examples herein, the sensed radiation may include radiation originating from the infrared radiation source reflected from the semiconductor device. The sensed radiation may include radiation originating from a radiation directing device and penetrating and emerging from the semiconductor device. The radiation directing device may be positioned proximal to the infrared radiation source and configured to direct radiation towards an opposing side of the semiconductor side. The processor may be configured to determine the dopant profile properties based on at least one of the infrared reflectance or infrared transmittance associated with the plurality of respective infrared wavebands.

In some embodiments, the processor may be coupled to or integral with a radiation detector and may execute processor-executable instructions for determining dopant profile properties based on infrared reflectance or transmittance associated with semiconductor devices under test.

Figure 12:
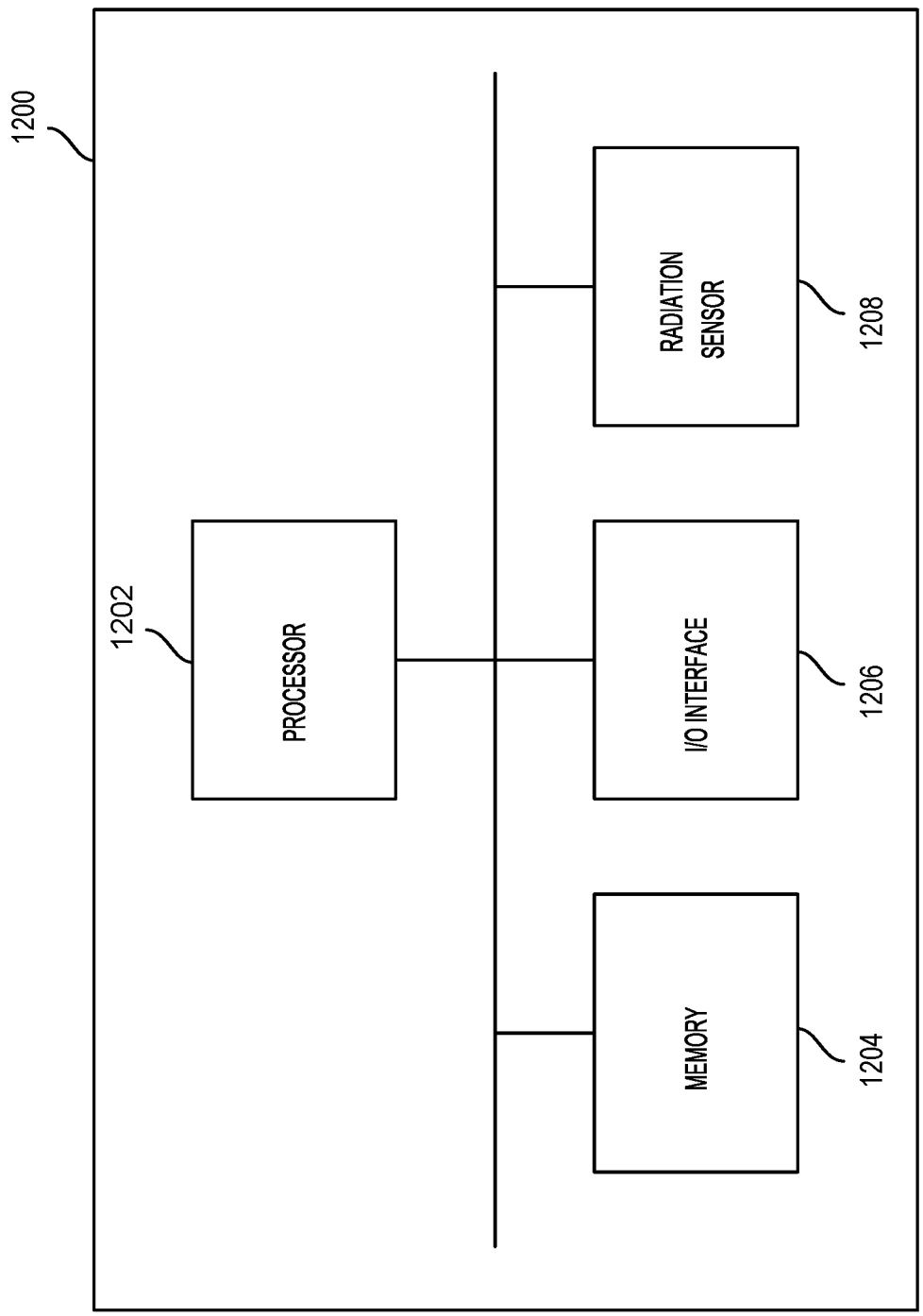
FIG. 12 illustrates a block diagram of a computing device, in accordance with an embodiment of the present disclosure.

Reference is made to FIG. 12, which illustrates a block diagram of a computing device 1200, in accordance with an embodiment of the present disclosure. As a non-limiting example, the infrared detection device 412, 712 of FIG. 4 or FIG. 7 may be implemented using the example computing device 1200 of FIG. 12.

The computing device 1200 includes at least one processor 1202, memory 1204, at least one I/O interface 1206, and at least one radiation sensor 1208.

The processor 1202 may be a microprocessor or microcontroller, a digital signal processing processor, an integrated circuit, a field programmable gate array (FPGA), a reconfigurable processor, or a programmable read-only memory (PROM), among other examples.

The memory 1204 may include a computer memory located either internally or externally such as, for example, random-access memory, read-only memory, compact disc read-only memory, electro-optical memory, magneto-optical memory, erasable programmable read-only memory, and electrically-erasable programmable read-only memory, or Ferroelectric RAM, among other examples.

The memory 1204 may include processor-readable instructions that, when executed, configure the processor to conduct operations disclosed in the present disclosure.

The I/O interface 1206 may enable the computing device 1200 to interconnect with one or more infrared radiation source devices, such as the infrared radiation source 410 of FIG. 4, the first infrared radiation source 710a, or the second infrared radiation source 710b, or other devices of a system for non-contact characterization of semiconductor devices.

Taking the system 700 of FIG. 7 as an example, the computing device 1200 may interconnect with the first infrared radiation source 710a and the second infrared radiation source 710b, and may transmit signals for controlling the modulation frequency of emitted infrared signals from the respective infrared radiation sources.

The at least one radiation sensor 1208 may be one or more sensors configured and positioned to receive radiation signals reflected from or penetrated through the semiconductor device under test.

In some embodiments, the one or more sensors may be positioned in combination with band pass filters or other devices to determine radiation energy portions for determining infrared transmittance, infrared reflectance, or other signal characteristics associated with the semiconductor device under test.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

What is claimed is:

1. A system for non-contact characterization of a semiconductor device under test comprising:
    an infrared radiation source directing radiation towards the semiconductor device;
    a radiation directing device positioned proximal the infrared radiation source and configured to direct radiation towards an opposing side of the semiconductor device, the semiconductor device receivable between the radiation directing device and the infrared radiation source; and
    a radiation detector proximal to the infrared radiation source and configured to sense radiation associated with a plurality of infrared wavebands from the semiconductor device for determining a dopant profile property of the semiconductor device, the sensed radiation including radiation originating from the infrared radiation source reflected from the semiconductor device, the sensed radiation including radiation originating from the radiation directing device and emerging from the semiconductor device,
    wherein the dopant profile properties based on at least one of infrared reflectance or infrared transmittance associated with the plurality of respective infrared wavebands.

2. The system of claim 1, wherein the radiation directing device is a supplementary radiation source emitting radiation towards and penetrating the semiconductor device,
    and wherein a portion of the radiation penetrating the semiconductor device is detected by the radiation detector to determine infrared transmittance associated with the semiconductor device.

3. The system of claim 2, wherein the supplementary radiation source and the infrared radiation source respectively direct radiation towards the semiconductor device from opposing sides at distinct modulating frequencies,
    and wherein the radiation detector demodulates sensed radiation from the semiconductor device for determining infrared reflectance or infrared transmittance.

4. The system of claim 1, wherein the radiation directing device includes a paddle configured to convey the semiconductor device proximal to the infrared radiation source and the radiation directing device,
    wherein the paddle includes a high reflectance background reflecting radiation towards the semiconductor device, the reflected radiation based on radiation emitted from the infrared radiation source.

5. The system of claim 4, wherein the high reflectance background includes at least one of aluminum or gold.

6. The system of claim 4, wherein the paddle includes a low reflectance background positioned adjacent the high reflectance background, wherein the low reflectance background includes at least one of an optical blackout material or an aperture through which incident radiation passes through.

7. The system of claim 6, wherein the low reflectance background is associated with a first sensing position and the high reflectance background is associated with a second sensing position towards which radiation from the infrared radiation source is emitted.

8. The system of claim 7, wherein a separation distance between the first sensing position and the second sensing position is based on an expected spatial uniformity of the semiconductor device under test.

9. The system of claim 7, wherein in response to radiation emitted from the infrared radiation source towards the first sensing position, the radiation detector is configured to sense reflected radiation from the semiconductor device for determining infrared reflectance,
    and wherein in response to radiation emitted from the infrared radiation source towards the second sensing position, the radiation detector is configured to sense radiation reflected from the radiation directing device and penetrating the semiconductor device for determining infrared transmittance.

10. The system of claim 9, wherein the paddle is configured to convey the semiconductor device from the first sensing position to the second sensing position or the second sensing position to the first sensing position.

11. The system of claim 1, wherein the plurality of wavebands is along a waveband spectrum from 1.2 μm to 20 μm.

12. The system of claim 11, wherein at least one of the plurality of wavebands overlaps with an adjacent waveband in the waveband spectrum from 1.2 μm to 20 μm.

13. The system of claim 1, wherein the dopant profile property of the semiconductor device includes sheet resistance or dopant surface concentration.

14. A method for non-contact characterization of a semiconductor device comprising:
    detecting a first radiation sample associated with a plurality of infrared wavebands from a first position, the first radiation sample including radiation originating from an infrared radiation source and reflected from a first side of the semiconductor device;
    detecting a second radiation sample associated with the plurality of infrared wavebands, the second radiation sample including radiation originating from a radiation directing device positioned on an opposing side of the semiconductor device, the second radiation sample based on radiation emerging from the first side of the semiconductor device; and
    determining a dopant profile property associated with the semiconductor device based on at least one of infrared reflectance determined based on the detected first radiation sample or infrared transmittance determined based on the detected second radiation sample.

15. The method of claim 14, wherein the radiation directing device includes a reflectance paddle having a low reflectance portion and a high reflectance portion,
    wherein the first radiation sample is detected when infrared radiation is directed towards a first position of the semiconductor device adjacent the low reflectance background,
    and wherein the second radiation sample is detected when infrared radiation is directed towards a second position of the semiconductor device adjacent the high reflectance background.

16. The method of claim 15, comprising:
- positioning the reflectance paddle for directing infrared radiation from the infrared radiation source towards the first position of the semiconductor device adjacent the low reflectance background; and
- in response to detecting the first radiation sample, positioning the reflectance paddle directing infrared radiation from the infrared radiation source towards the second position of the semiconductor device adjacent the high reflectance background.

17. The method of claim 15, wherein a separation distance between the first sensing position and the second sensing position is based on an expected spatial uniformity of the semiconductor device under test.

18. The method of claim 14, wherein the radiation directing device includes a supplementary radiation source emitting radiation towards and penetrating the semiconductor device,
- and wherein the second radiation sample is based on radiation originating from the supplementary radiation source and emerging from the first side of the semiconductor device for determining infrared transmittance associated with the semiconductor device.

19. The method of claim 18, wherein the infrared radiation source and the supplementary radiation source respectively emit infrared light at distinct modulation frequencies, and wherein the method comprises demodulating the first radiation sample and the second radiation sample.

20. The method of claim 14, wherein the plurality of infrared wavebands includes wavebands along a spectrum from 1.2 µm to 20 µm.

\* \* \* \* \*